United States Patent
Smith, Jr. et al.

(10) Patent No.: US 6,443,538 B1
(45) Date of Patent: Sep. 3, 2002

(54) FEED VALVE AND REFERENCE PRESSURE ENHANCEMENT

(75) Inventors: Eugene A. Smith, Jr., Satellite Beach, FL (US); Milt Deno, Melbourne, FL (US); Don K. Johnson, Palm Bay, FL (US)

(73) Assignee: GE Harris Railway Electronics, LLC, Melbourne, FL (US)

( * ) Notice: Subject to any disclaimer, the term of this patent is extended or adjusted under 35 U.S.C. 154(b) by 0 days.

(21) Appl. No.: 10/034,977

(22) Filed: Dec. 27, 2001

Related U.S. Application Data

(60) Provisional application No. 60/259,030, filed on Dec. 29, 2000.

(51) Int. Cl.$^7$ ............................... B60T 8/34; B61L 3/00
(52) U.S. Cl. ..................... 303/128; 303/7; 246/169 R
(58) Field of Search ..................... 303/7, 8, 28, 29, 303/52, 54, 66, 81, 128, 135; 246/167 R, 169 R, 3

(56) References Cited

U.S. PATENT DOCUMENTS

| | | |
|---|---|---|
| 3,988,041 A | 10/1976 | Morris |
| 4,073,544 A | 2/1978 | Hart |
| 4,145,090 A | 3/1979 | Hart |
| 4,175,792 A | 11/1979 | Hart |
| 4,339,997 A | 7/1982 | Chiles |
| RE31,059 E | 10/1982 | Hart |
| 4,679,863 A | 7/1987 | Ikeda et al. |
| 4,755,803 A | 7/1988 | Shockley et al. |
| 4,944,564 A | 7/1990 | Balukin et al. |
| 4,946,229 A | 8/1990 | Deno et al. |
| 4,978,179 A | 12/1990 | Balukin et al. |
| 5,039,038 A * | 8/1991 | Nichols et al. ......... 246/167 R |
| 5,374,015 A * | 12/1994 | Bezos et al. ............ 246/169 R |
| 5,460,435 A | 10/1995 | Chew |
| 5,507,567 A | 4/1996 | Chew |
| 5,788,338 A | 8/1998 | Hart et al. |
| 5,934,764 A | 8/1999 | Dimsa et al. |
| 5,966,674 A * | 10/1999 | Crawford et al. ............. 702/47 |
| 6,126,247 A | 10/2000 | Paul et al. |
| 6,219,595 B1 | 4/2001 | Nickles et al. |
| 6,375,276 B1 * | 4/2002 | Delaruelle ..................... 303/7 |

\* cited by examiner

Primary Examiner—Christopher P. Schwartz
(74) Attorney, Agent, or Firm—Carl A. Rowold; Armstrong Teasdale LLP

(57) ABSTRACT

A method to facilitate reducing delays in braking applications in a train using a system. The system includes at least one computer for executing brake control functions of the train and a brake pipe that extends along a length of the train for supplying air for brake operations. The train includes a lead locomotive, at least one remote locomotive, and at least one railcar. The method includes sensing a change in airflow in the brake pipe, determining whether the change in air flow is desired, sensing brake pipe pressure, and filtering undesired fluctuations in brake pipe pressure during brake applications based on the determination of whether a change in airflow is desired.

30 Claims, 3 Drawing Sheets

FEED VALVE AND REFERENCE PRESSURE ENHANCEMENT

CROSS REFERENCE TO RELATED APPLICATIONS

This application claims the benefit of U.S. Provisional Application No. 60/259,030, filed Dec. 29, 2000.

BACKGROUND OF THE INVENTION

This invention relates generally to braking applications of a distributed power train, and more particularly to facilitating reducing delays in braking applications of later sections of the train when communication has been lost between a remote locomotive and a lead locomotive, and to facilitate reducing undesired brake releases once a brake application has begun.

A distributed power train typically includes a lead locomotive and one or more remote locomotives, and railcars, comprehensively referred to as rolling stock. Each piece of rolling stock has braking equipment including at least a section of brake pipe, a brake control valve, reservoirs, and a brake cylinder. Each lead and remote locomotive has braking equipment that includes at least a main reservoir, a section of brake pipe, a feed valve, a cutoff valve, a relay valve, a brake control valve, and a brake cylinder. The brake pipe sections are connected to form a brake pipe that extends the length of the train. When the feed valve of a locomotive is "cut-in", the relay valve is enabled, and controls the brake pipe by. charging or increasing the brake pipe pressure to release the train brakes, or exhausting the brake pipe pressure to apply the train brakes. When the feed valve is,"cut-out", the relay valve is disabled and the control of the brake pipe is suspended for that locomotive. At least some known railway braking equipment does not have an accelerated emergency-braking feature wherein each piece of rolling stock in the train exhausts air from the brake pipe locally. Rather, for emergency braking situations, the entire brake pipe must be exhausted through the locomotives. During distributed power operations on trains that do not have the accelerated emergency-braking feature, emergency braking is accomplished by venting the brake pipe at both the lead and remote locomotives. However, if communication is lost between the lead and remote locomotives, then the remote locomotive will not receive the emergency brake command and the brake pipe must be entirely vented by the lead locomotive.

To further complicate such a situation, if the remote locomotive maintains the feed valve in a "cut-in" position, the braking equipment of the remote locomotive will attempt to increase the brake pipe pressure, thus reversing the brake application being applied from the lead locomotive. Also, if the remote locomotive remains in traction, it will continue to push the front part of the train. This situation can cause dangerously high "in-train" forces to build within the train if the remote locomotive is not idled and the feed valve is not "cut-out" quickly enough.

To facilitate minimizing such effects, at least some known systems utilize a flow sensing feature that detects when a train brake application has been made and idles the remote locomotive and cuts-out the remote feed valve. The flow sensing features sense the airflow in the brake pipe resulting from a brake application. If the lead locomotive has communicated to the remote locomotive that a brake application is to occur, then the remote locomotive will follow the throttle and brake applications from the lead locomotive. Conversely, if the lead locomotive has not communicated to the remote locomotive that a brake application is to occur, then upon sensing a change in air flow identifying an application of the brakes, the remote locomotive attempts to communicate with the lead locomotive to verify if the brake application is desired. If the lead locomotive signals that the brake application is desired the remote locomotive will follow the throttle and brake applications from the lead locomotive. If the lead locomotive does not reply to the remote locomotive communication check, then the remote locomotive is set to idle and the feed valve is "cut-out", which disables the relay valve and brake pipe charging/exhausting is suspended.

During times of communication loss between the lead and remote locomotives, the feature of verifying with the lead locomotive that brake application is desired takes a number of seconds to accomplish. During this time, the remote locomotive continues in traction and supplies air into the brake pipe, thereby minimizing the braking effect in the later sections of the train. During emergency brake applications this delayed feed valve cut-out and idling of the remote locomotive creates the undesirable situation where the front part of the train has maximum braking, the later parts of the train have minimum or no braking, and the remote locomotive continues to push the front part of the train. The net result is that the rear of the train runs into the front part of the train causing high in-train forces and possible derailment.

BRIEF DESCRIPTION OF THE INVENTION

In one aspect, a method is provided to facilitate reducing delays in braking applications in a train using a system. The system includes at least one computer for executing brake control functions of the train and a brake pipe that extends along a length of the train for supplying air for brake operations. The train includes a lead locomotive, at least one remote locomotive, and at least one railcar. The method includes sensing a change in airflow in the brake pipe, determining whether the change in air flow is desired, sensing brake pipe pressure; and filtering undesired fluctuations in brake pipe pressure during brake applications based on the determination of whether the change in airflow is desired.

In another aspect, a system is provided to facilitate reducing delays in braking applications in a train. The system includes at least one computer for executing brake control functions of the train and a brake pipe that extends along a length of the train for supplying air for brake operations. The train includes a lead locomotive, at least one remote locomotive, and at least one railcar. The system is configured to sense a change in airflow in said brake pipe, determine whether the change in air flow is desired, sense brake pipe pressures; and filter undesired fluctuations in brake pipe pressure during brake applications based on the determination of whether the change in airflow is desired.

In yet another aspect, a system is provided for filtering undesired fluctuations in brake pipe pressure during brake application in a train. The train includes at least one of a lead locomotive, a remote locomotive, and a railcar. The system includes at least one computer for executing brake control functions of the train, and a brake pipe that extends along a length of the train for supplying air for brake operations. The brake pipe includes at least one brake pipe section such that each lead locomotive and remote locomotive in the train includes a respective brake pipe section. Each brake pipe section includes a feed valve cutoff valve and relay valve for controlling the flow of air into the respective brake pipe section, a brake pipe flow sensor for sensing air flow into the brake pipe, and a brake pipe pressure sensor for sensing pressure in the respective brake pipe section. The system is configured to initiate a feed valve cut-out for each lead locomotive feed valve and remote locomotive feed valve, measure an initial pressure in each lead locomotive brake pipe section and remote brake pipe section. The system is further configured to set a reference pressure for each brake pipe section equal to the value of the initial pressure of the respective brake pipe section.

DETAILED DESCRIPTION OF THE INVENTION

Figure 1:
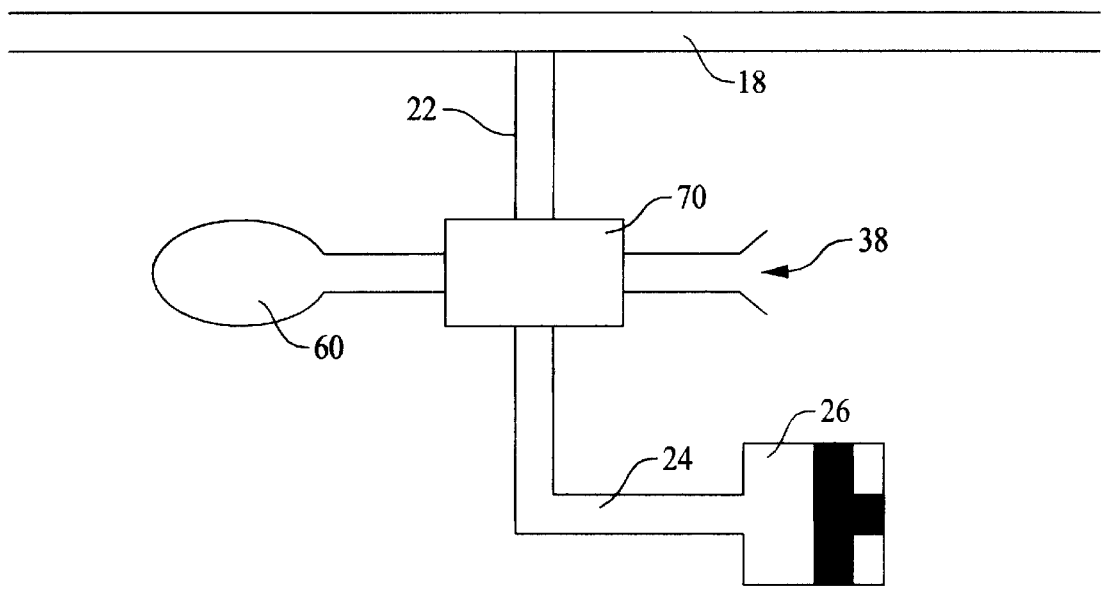
FIG. 1 is an exemplary schematic of the railcar section for a system to facilitate reducing delays in braking applications and reducing undesired brake releases in a train.
Figure 2:
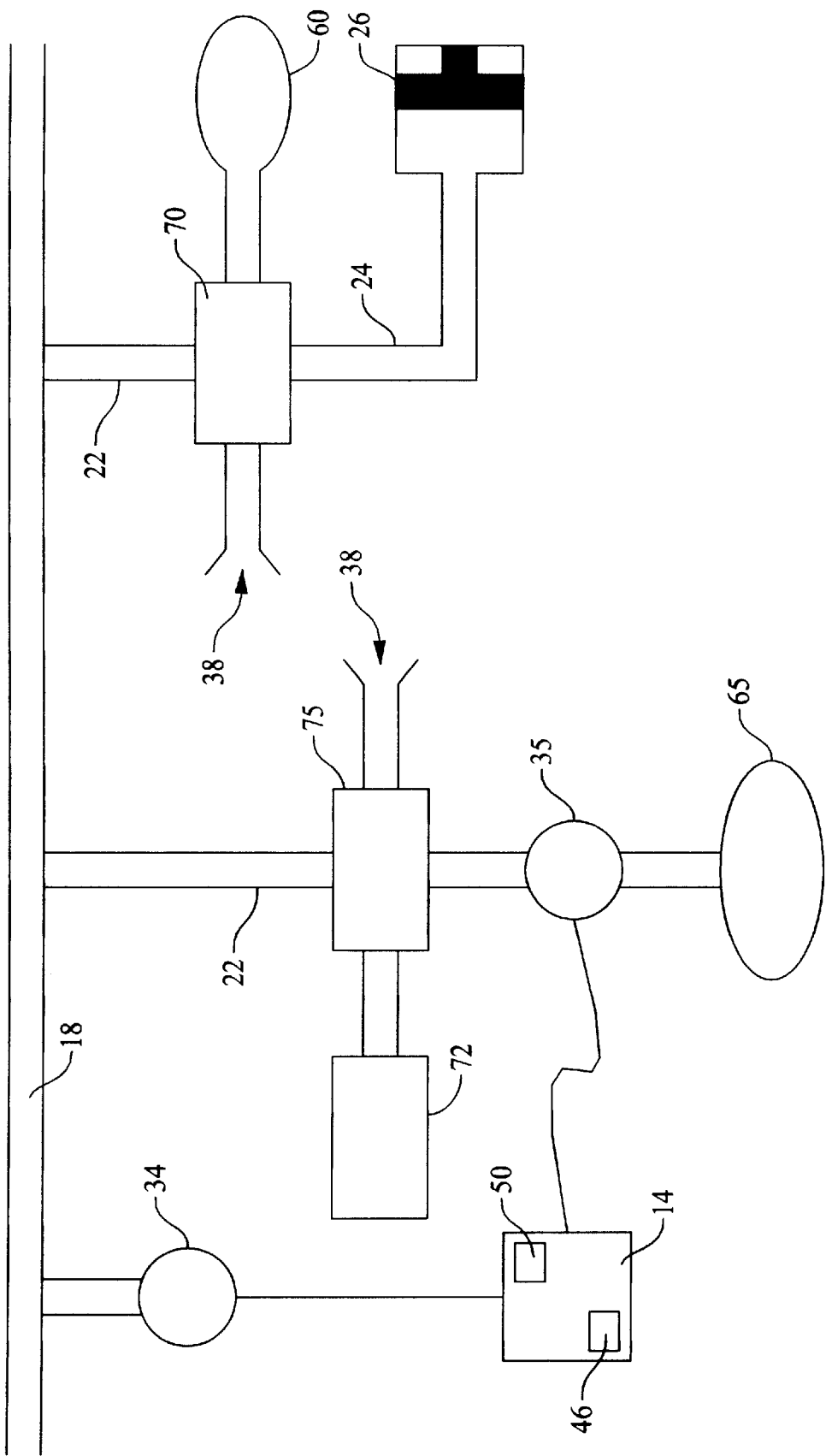
FIG. 2 is an exemplary schematic of the locomotive section for a system to facilitate reducing delays in braking applications and reducing undesired brake releases in a train.

FIGS. 1 and 2 are exemplary schematics of a system 10 used to facilitate reducing delays in braking applications within a train (not shown) when communication has been lost between a remote locomotive (not shown) and a lead locomotive (not shown). Furthermore, system 10 facilitates reducing undesired brake releases once a brake application has begun.

As used herein, the term "train" means one or more locomotives and one or more railcars physically connected together, with one locomotive designated as a lead locomotive and other locomotives designated as remote locomotives.

Referring now to FIG. 1, system 10 rail car brake equipment includes a control valve 70 for executing brake control functions of the train and a brake pipe 18 that extends along a length of the train. Brake pipe 18 includes a plurality of connected brake pipe sections 22 and 24 for supplying and venting air during operation of a brake cylinder 26. When the train brakes are released, air pressure in brake pipe 18 increases to some defined release pressure. Control valve 70 charges a reservoir 60 to the defined release pressure and vents brake cylinder 26 pressure through an exhaust 38. When the train brakes are applied, brake pipe 18 pressure drops. Control valve 70 measures the difference in brake pipe 18 pressure and reservoir 60 pressure, and applies the difference in pressure to brake cylinder 26. A greater drop in brake pipe 18 pressure results in a greater difference in pressure with reservoir 60, and a greater brake cylinder 26 pressure.

Referring now to FIG. 2, system 10 locomotive equipment includes at least one computer 14 for executing brake control functions of a train, and a brake pipe 18 that extends along a length of the train. The brake pipe includes a plurality of connected brake pipe sections 22 and 24 for supplying and venting air during operation of brake cylinder 26 as discussed above regarding system 10 railcar brake equipment. Each locomotive in the train also includes a respective brake pipe section 22 including a relay valve 75 that controls the flow of air in the respective brake pipe section 22. Also, a main reservoir 65 supplies air through an air flow sensor 35 to relay valve 75 during charging (releasing of the brakes) of brake pipe 18. Air flow sensor 35 communicates flow pressure values to computer 14. In addition, each brake pipe section 18 includes a brake pipe pressure sensor 34 for sensing pressure in brake pipe section 18 and communicating pressure values to computer 14. Furthermore, system 10 includes an exhaust 38 that is connected to relay valve 75 for exhausting air from brake pipe section 22. Additionally, system 10 includes a feed valve cutoff valve 72 that supplies air to disable operation of relay valve 75 and suspend release and application capabilities of relay valve 75. Computer 14 includes a processor 46 for executing all functions of computer 14, and an electronic storage device 50 for storing information, programs and data.

In one embodiment, system 10 includes one computer 14 located in each locomotive in the train. Each computer 14 controls the operation of a respective feed valve cutoff valve 72 which controls the operation of relay valve 75, and communicates with sensors 34 and 35 of the respective locomotive in which it is located. Additionally, each computer 14 coordinates communications between the respective locomotive and all other locomotives in the train. However, alternate embodiments are possible wherein, for example, system 10 includes only one computer 14 located in the lead locomotive, or system 10 includes one of a plurality of computers 14 located in each locomotive.

When a train encounters an emergency braking situation, the lead locomotive initiates an emergency brake application and the brakes for the entire train are applied by venting brake pipe 18. In railcar equipment without emergency propagation capabilities, the emergency venting of brake pipe 18 occurs through both the lead and remote locomotives. The lead locomotive sends an emergency braking command to the remote locomotive notifying the remote locomotive that an emergency brake application is desired. However, if communications are lost between the lead locomotive and the remote locomotive, the lead locomotive starts to vent brake pipe 18.

In one embodiment, sensors 34 and 35 monitor the air flow and air pressure in brake pipe section 22. When an emergency braking situation occurs and a remote locomotive has not received an emergency braking command, the venting of brake pipe 18 through the lead locomotive causes air to flow in brake pipe 18 and all brake pipe sections 22, thereby causing all brakes in the train to start to engage. Sensor 35 senses the flow in brake pipe section 22 and communicates the air flow to computer 14. Computer 14 identifies the flow as unexpected flow, and immediately cuts-out feed valve cutoff valve 72 so that system 10 will not attempt to fill brake pipe section 22 and release the brake application. Furthermore, computer 14 initiates communication of a message from the remote locomotive to the lead locomotive to verify whether the brake application is desired.

After the verification message is sent by computer 14, the lead locomotive signals whether or not the brake application is desired. If the lead locomotive signals that the brake application is desired, computer 14 cuts back in feed valve cutoff valve 72, system 10 allows relay valve 75 to apply brakes as commanded by the lead locomotive, and the remote locomotive remains in commanded traction. Conversely, if the remote locomotive does not receive a signal from the lead locomotive, then computer 14 continues to cut-out feed valve 30 and idles the remote locomotive within one second of detecting the unexpected air flow in brake pipe section 22.

Once a brake application is confirmed, sensor 34 continues to monitor air pressure in brake pipe section 22. In one embodiment, sensor 34 samples the air pressure at a specified duty cycle and transmits each pressure measurement to computer 14. Computer 14 establishes an initial brake pipe reference pressure using the first pressure value transmitted by sensor 34 as the brake application begins. Subsequently, sensor 34 continues to transmit samples to computer 14 and computer 14 compares each subsequent sample to the initial reference pressure. An increase in pressure of a specified amount and for a specified duration indicates a potential brake release. If a brake release is undesired, but the monitored air pressure in brake pipe section 22 indicates that a release has occurred, the train is put into an emergency state and brake pipe 18 is vented in its entirety. Therefore, to reduce undesired brake releases due to fluctuation of air pressure in brake pipe section 22, computer 14 filters out undesired fluctuations using the pressure samples.

After the initial brake pipe reference pressure is established, computer 14 accumulates a sample set consisting of the next seven pressure samples. Computer 14 then determines a maximum value of the sample set and compares the maximum value to an initial reference pressure. If the maximum sample set value is greater than the initial reference pressure value, the initial reference pressure value remains unchanged and each subsequent sample is compared to that value. If the maximum sample set value is less than the initial reference pressure value, the reference pressure value is reset to a filtered reference pressure of the maximum sample set value and subsequent samplings are compared to the filtered reference pressure. The next seven samples are accumulated into a set, and the maximum value of the set is compared to filtered reference pressure, such that the filtered reference pressure value is left unchanged or is reset to the maximum value of the latest sample set. The cycle continues until the pressure in brake pipe section 22 drops to a specified low point that is considered to be a full brake application.

If at any point during the brake application, sampled pressures, when compared to the filtered reference pressure, indicate an increase in pressure of the specified amount for the specified duration, and a brake release is undesired, the train is put into an emergency state and brake pipe 18 is entirely vented. The method of reducing undesired brake releases described above is not limited to use when a brake application has occurred with communications lost between a remote locomotive and a lead locomotive. In an alternate embodiment, the method for reducing undesired brake releases is utilized for all brake applications, regardless of whether communications have been lost between the remote and lead locomotives.

Figure 3:
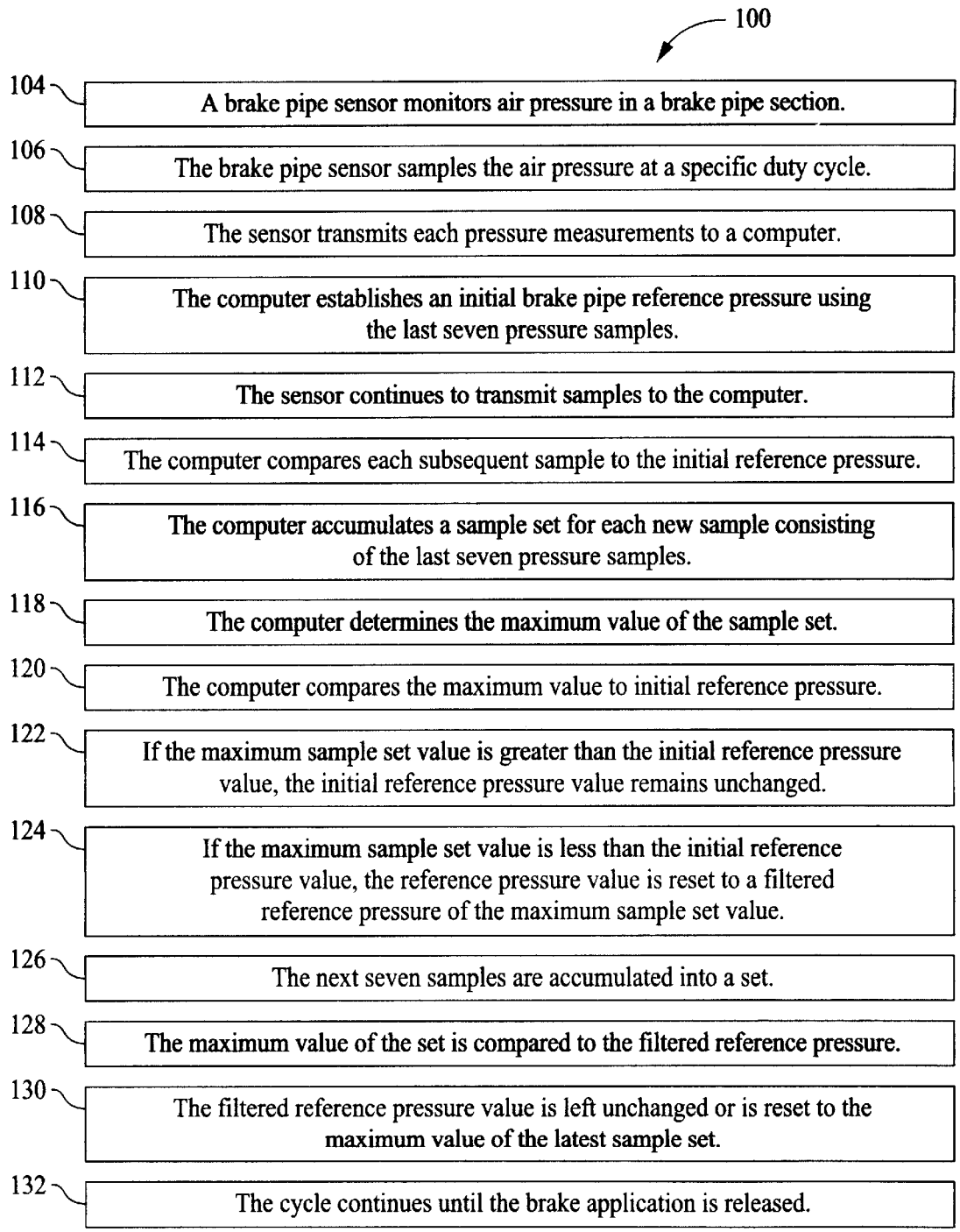
FIG. 3 is a flow chart of an exemplary method utilizing the system shown in FIGS. 1 and 2 to facilitate reducing undesired brake releases during brake applications of a train.

FIG. 3 is a flow chart 100 illustrating an exemplary method of utilizing system 10 (shown in FIG. 1) to facilitate reducing undesired brake releases during brake applications of a train. During a train braking application, a brake pipe sensor monitors 104 air pressure in a brake pipe section by sampling 106 the air pressure at a specified duty cycle. The sensor then transmits 108 each pressure measurement to a computer. The computer establishes 110 an initial brake pipe reference pressure using the maximum value of the last seven pressure samples transmitted by the sensor as the brake application begins. Subsequently, the sensor continues to transmit 112 samples to the computer and the computer compares 114 each subsequent sample to the initial reference pressure. An increase in pressure of a specified amount and for a specified duration indicates a potential brake release. If a brake release is undesired, but the monitored air pressure in the brake pipe section indicates that a release has occurred, the train is put into an emergency state and the brake pipe is entirely vented. Therefore, to reduce undesired brake releases due to fluctuation of air pressure in the brake pipe section, the computer filters out undesired fluctuations using the pressure samples.

After the initial brake pipe reference pressure is established, the computer accumulates 116 a sample set for each new sample consisting of the last seven pressure samples. The computer then determines 118 a maximum value of the sample set and compares 120 the maximum value to the initial reference pressure. If the maximum sample set value is greater than the initial reference pressure value, the initial reference pressure value remains unchanged 122 and each subsequent sample is compared to that value. If the maximum sample set value is less than the initial reference pressure value, the reference pressure value is reset 124 to a filtered reference pressure of the maximum sample set value and subsequent samplings are compared to the filtered reference pressure. The next seven samples are accumulated 126 into a set, the maximum value of the set is compared 128 to filtered reference pressure, and the filtered reference pressure value is left unchanged or is reset 130 to the maximum value of the latest sample set. The cycle continues 132 until the brake application is released.

While the invention has been described in terms of various specific embodiments, those skilled in the art will recognize that the invention can be practiced with modification within the spirit and scope of the claims.

What is claimed is:

1. A method to facilitate reducing delays in braking applications in a train using a system including at least one computer for executing brake control functions of the train and a brake pipe that extends along a length of the train for supplying air for brake operations, the train including a lead locomotive, at least one remote locomotive, and at least one railcar, said method comprising:
   sensing a change in airflow in the brake pipe;
   determining whether the change in airflow is desired;
   sensing brake pipe pressure; and
   filtering undesired fluctuations in brake pipe pressure during brake applications based on the determination of whether the change in airflow is desired.

2. A method in accordance with claim 1 wherein the method further facilitates reducing undesired brake releases in the train, and the brake pipe includes a plurality of connected brake pipe sections such that each lead locomotive and remote locomotive in the train includes a respective brake pipe section that includes a feed valve cutoff valve and relay valve for controlling a flow of air into each respective brake pipe section, a brake pipe pressure sensor for sensing pressure in each respective brake pipe section, and a brake pipe flow sensor for sensing airflow into the brake pipe, sensing a change in air flow in the brake pipe comprising monitoring the air flow in each remote locomotive brake pipe section.

3. A method in accordance with claim 2 further comprising sensing a change in air flow in at least one remote locomotive brake pipe section.

4. A method in accordance with claim 3 further comprising implementing a feed valve cut-out of the remote locomotive feed valve upon sensing the change in airflow.

5. A method in accordance with claim 4 wherein determining whether a change in air flow is desired comprises the step of sending a verification message from the remote locomotive to at least one of the lead locomotives upon sensing the change in air flow.

6. A method in accordance with claim 5 further comprising not receiving a signal from the lead locomotive indicating the change in airflow is desired.

7. A method in accordance with claim 6 wherein determining whether a change in air flow is desired comprises:

maintaining the feed valve cut-out of the remote locomotive feed valve; and idling the remote locomotive.

8. A method in accordance with claim 5 further comprising receiving a signal from the lead locomotive indicating the change in airflow is not desired.

9. A method in accordance with claim 8 wherein reacting to the determination of whether a change in airflow is desired comprises implementing a feed valve "cut-in" of the remote locomotive feed valve and allowing the remote locomotive to apply brakes as commanded by the lead locomotive, wherein the remote locomotive remains in a commanded traction state.

10. A method in accordance with claim 2 wherein filtering undesired fluctuations in brake pipe pressure comprises:

measuring an initial pressure in the remote brake pipe section upon receipt of a brake application command; and setting a reference pressure for the remote brake pipe section equal to the value of the highest value of the last seven pressure samples from the brake pipe pressure sensor.

11. A method in accordance with claim 10 further comprising:

sampling the pressure, at a specified duty cycle, in the remote brake pipe section;

accumulating a sample set for the remote brake pipe section, the sample set for each new sample consisting of the last seven samples; and determining a maximum value of the sample set.

12. A method in accordance with claim 11 further comprising:

comparing the maximum value of the sample set to the reference pressure;

resetting the reference pressure equal to the maximum value if the maximum value is less than the reference pressure; and retaining the reference pressure if the maximum value is greater than the reference pressure.

13. A method in accordance with claim 12 further comprising:

repeating the steps of sampling the pressure, accumulating a sample set, determining a maximum value, comparing the maximum value, resetting the reference pressure, and retaining the reference pressure until the brake pipe pressure for the remote brake pipe section drops to a specified level;

comparing the value of each sampled pressure to the brake pipe reference pressure after each sampling; and determining whether an undesired brake release has occurred in the remote locomotive based on the comparison of each sampled pressure to the reference pressure.

14. A system to facilitate reducing delays in braking applications in a train, said system comprising at least one computer for executing brake control functions of the train and a brake pipe that extends along a length of the train for supplying air for brake operations, the train comprising a lead locomotive, at least one remote locomotive, and at least one railcar, said system configured to sense a change in airflow in said brake pipe;

determine whether the change in air flow is desired;

sense brake pipe pressure; and filter undesired fluctuations in brake pipe pressure during brake applications based on the determination of whether the change in airflow is desired.

15. A system in accordance with claim 14 wherein said system further facilitates reducing undesired brake, releases in the train, said brake pipe comprises a plurality of connected brake pipe sections such that each lead locomotive and remote locomotive in the train comprises a respective brake pipe section that includes a feed valve cutoff valve and relay for controlling the flow of air into each said respective brake pipe section, a brake pipe pressure sensor for sensing pressure in each said respective brake pipe section, and a brake pipe flow sensor for sensing air flow into the brake pipe, said system further configured to sense a change in air flow in said brake pipe, said system configured to monitor the air flow in each remote locomotive brake pipe section.

16. A system in accordance with claim 15 further configured to sense a change in airflow in said remote locomotive brake pipe section.

17. A system in accordance with claim 16, further configured to implement a feed valve cut-out of said remote locomotive feed valve upon sensing the change in air flow.

18. A system in accordance with claim 17 wherein to determine whether the change in air flow is desired, said system configured to send a verification message from said remote locomotive to at least one of said lead locomotives upon sensing the change in air flow.

19. A system in accordance with claim 18 further configured to not receive a signal from said lead locomotive indicating that the change in airflow is desired.

20. A system in accordance with claim 19 wherein to react to the determination of whether the change in air flow is desired, said system configured to:

maintain the feed valve cut-out of said remote locomotive feed valve; and idle said remote locomotive.

21. A system in accordance with claim 18 further configured to receive a signal from said lead locomotive indicating the change airflow is not desired.

22. A system in accordance with claim 21 wherein to react to the determination of whether a change in airflow is desired, said system configured to implement a feed valve "cut-in" of said remote locomotive feed valve, allow the remote locomotive to apply brakes as commanded by the lead locomotive, wherein the remote locomotive remains in a commanded traction state.

23. A system in accordance with claim 15 wherein to filter undesired fluctuations in brake pipe pressure, said system configured to:

measure an initial pressure in said remote brake pipe section upon receipt of a brake application command; and set a reference pressure for said remote brake pipe section equal to the value of the highest value of the last seven pressure samples from the brake pipe sensor.

24. A system in accordance with claim 23 further configured to:

sample the pressure, at a specified duty cycle, in said remote brake pipe section;

accumulate a sample set for said remote brake pipe section, the sample set for each new sample comprising the last seven samples; and determine a maximum value of the sample set.

25. A system in accordance with claim 24 further configured to:

compare the maximum value of the sample set to the reference pressure;

reset the reference pressure equal to the maximum value if the maximum value is less than the reference pressure; and retain the reference pressure if the maximum value is greater than the reference pressure.

26. A system in accordance with claim 25 further configured to:

continue to sample the pressure, accumulate a sample set, determine the maximum value, compare the maximum value, reset the reference pressure, and retain the reference pressure until the brake pipe pressure for said remote brake pipe section drops to a specified level;

compare a value of each sampled pressure to the brake pipe reference pressure after each sampling; and determine whether an undesired brake release has occurred in said remote locomotive based on the comparison of each sampled pressure to said reference pressure.

27. A system for filtering undesired fluctuations in brake pipe pressure during brake application in a train, the train comprising at least one of a lead locomotive, a remote locomotive, and a railcar, said system comprising:

at least one computer for executing brake control functions of the train; and a brake pipe that extends along a length of the train for supplying air for brake operations, said brake pipe comprising at least one brake pipe section such that each lead locomotive and remote locomotive in the train comprises a respective brake pipe section, each said brake pipe section comprising:

a feed valve cutoff valve and relay valve for controlling the flow of air into said respective brake pipe section;

a brake pipe flow sensor for sensing air flow into the brake pipe; and a brake pipe pressure sensor for sensing pressure in said respective brake pipe section, wherein said system configured to initiate a feed valve cut-out for each said lead locomotive feed valve and said remote locomotive feed valve, measures an initial pressure in each said lead locomotive brake pipe section, said remote brake pipe section, and sets a reference pressure for each said brake pipe section equal to the value of the initial pressure of said respective brake pipe section.

28. A system in accordance with claim 27 further configured to:

sample the pressure, at a specified duty cycle, in each said lead locomotive brake pipe section and said remote brake pipe section during brake applications;

accumulate a sample set for each said brake pipe section, the sample set for each new sample comprising the last seven samples; and determine a maximum value of each sample set.

29. A system in accordance with claim 28 further configured to:

compare the maximum value for each sample set to the respective brake pipe reference pressure;

reset the respective reference pressure for said respective brake pipe section equal to the respective maximum value if the respective maximum value is less than the respective brake pipe reference pressure; and retain the respective reference pressure for said respective brake pipe section if the respective maximum value is greater than the respective brake pipe reference pressure.

30. A system in accordance with claim 29 further configured to:

continue to sample the pressure, accumulate the sample set, determine the maximum value, compare the maximum value, reset the reference pressure, and retain the reference pressure until the brake application is released;

compare a value of each sampled pressure to the respective brake pipe reference pressure; and determine whether an undesired brake release has occurred in the respective lead locomotive and remote locomotive based on the comparison of each sampled pressure to the respective brake pipe reference pressure.

* * * * *

UNITED STATES PATENT AND TRADEMARK OFFICE
CERTIFICATE OF CORRECTION

PATENT NO.    : 6,443,538 B1
DATED         : September 3, 2002
INVENTOR(S)   : Smith, Jr. et al.

It is certified that error appears in the above-identified patent and that said Letters Patent is hereby corrected as shown below:

Column 8,
Line 6, delete ",".

Column 9,
Line 44, delete "measures" and insert therefor -- measure --.

Column 10,
Line 2, delete "sets" and insert therefor -- set --.

Signed and Sealed this

Eleventh Day of February, 2003

JAMES E. ROGAN
*Director of the United States Patent and Trademark Office*